United States Patent [19]

Borgendale et al.

[11] Patent Number: 4,731,735
[45] Date of Patent: Mar. 15, 1988

[54] MULTILINGUAL PROCESSING FOR SCREEN IMAGE BUILD AND COMMAND DECODE IN A WORD PROCESSOR, WITH FULL COMMAND, MESSAGE AND HELP SUPPORT

[75] Inventors: Ken W. Borgendale, Gaithersburg; Paul S. Cheng, Potomac; Mike D. Flannery; Lisa K. Peters, both of Gaithersburg; Kenneth A. Zaiken, Germantown, all of Md.

[73] Assignee: International Business Machines Corporation, Armonk, N.Y.

[21] Appl. No.: 781,862

[22] Filed: Sep. 30, 1985

[51] Int. Cl.⁴ .......................... G06F 3/14; G06F 15/38
[52] U.S. Cl. ..................................... 364/200; 364/419
[58] Field of Search ... 364/200 MS File, 900 MS File, 364/419

[56] References Cited

U.S. PATENT DOCUMENTS

| | | | |
|---|---|---|---|
| 3,350,695 | 12/1964 | Kaufman et al. | 364/300 |
| 3,454,929 | 7/1969 | Hynes et al. | 364/200 |
| 3,815,104 | 6/1974 | Goldman | 364/200 |
| 4,110,823 | 8/1978 | Cronshaw et al. | 364/200 |
| 4,122,533 | 10/1978 | Kubinak | 364/900 |
| 4,150,429 | 4/1979 | Ying | 364/200 |
| 4,158,236 | 6/1979 | Levy | 364/200 |
| 4,161,777 | 7/1979 | Ying | 364/200 |
| 4,193,119 | 3/1980 | Arase et al. | 364/900 |
| 4,218,760 | 8/1980 | Levy | 364/200 |
| 4,264,217 | 4/1981 | De Sieno | 400/63 |
| 4,270,182 | 5/1981 | Asija | 364/900 |
| 4,308,582 | 12/1981 | Berger | 364/300 |
| 4,365,315 | 12/1982 | Jamnik | 364/900 |
| 4,383,307 | 5/1983 | Gibson, III | 364/900 |
| 4,387,424 | 6/1983 | Frediani et al. | 364/200 |
| 4,398,246 | 8/1983 | Frediani et al. | 364/200 |
| 4,398,264 | 8/1983 | Couper et al. | 364/900 |
| 4,424,563 | 1/1984 | Lynch | 364/200 |
| 4,428,065 | 1/1984 | Duvall et al. | 364/900 |
| 4,441,162 | 4/1984 | Lillie | 364/900 |
| 4,456,973 | 6/1984 | Carlgren et al. | 364/900 |
| 4,481,578 | 11/1984 | Hughes et al. | 364/200 |
| 4,484,305 | 11/1984 | Ho | 364/900 |
| 4,566,078 | 1/1986 | Crabtree | 364/900 |
| 4,595,980 | 6/1986 | Innes | 364/200 |
| 4,615,002 | 9/1986 | Innes | 364/200 |
| 4,635,199 | 1/1987 | Muraki | 364/419 |

Primary Examiner—Gary V. Harkcom
Assistant Examiner—Randy W. Lacasse
Attorney, Agent, or Firm—John E. Hoel

[57] ABSTRACT

A multilingual processor is disclosed herein, for building screen images on the display screen and for decoding multilingual commands, in an information processing system. The information processing system includes an execution unit having a memory, a bulk storage and a workstation connected thereto, the workstation including a keyboard connected to a display screen for inputting command and working text information to the display screen. The multilingual processor includes a document library stored in the bulk storage device including a plurality of language documents and at least one user document. The language documents each characterize a selected language and include a displayable components portion and an executable components portion. A language document selector accesses a selected one of the plurality of language documents in response to a user language selection input from the keyboard specifying that commands and messages are to be in one of the selected languages. A message processor accesses the displayable components portion from the first one of the language documents, for the real-time display of messages on the display screen in the first language. A command processor accesses the executable components portion from the first one of the language documents in response to a user command input in the first selected language to the keyboard, for decoding and executing the user command input in the first language.

2 Claims, 8 Drawing Figures

HOST DATA
PROCESSING SYSTEM

DOCUMENT LIBRARY 12

SCREEN IMAGE

| SCREEN AREA | LANGUAGE DOCUMENT COMPONENT | |
|---|---|---|
| | FOR SCREEN BUILD | FOR SCREEN DECODE |
| S1 | N/A | N/A |
| S2 | L1,L2,L3 | N/A |
| S3 | L1 | N/A |
| S4 | L1 | N/A |
| S5 | N/A | N/A |
| S6 | N/A | N/A |
| S7 | L2,L3 | N/A |
| S8 | N/A | L1,L2,L3 |
| S9 | N/A | N/A |
| S10 | L1 | N/A |
| S11 | L1,L2 | N/A |
| S12 | L1 | N/A |
| S13 | L1 | L1,L2,L3 |

FIG. 5

LANGUAGE DOCUMENT TO
SCREEN IMAGE BUILD
AND DECODE RELATIONSHIP

SYSTEM BLOCK
DIAGRAM

FLOW DIAGRAM

MULTILINGUAL PROCESSING FOR SCREEN IMAGE BUILD AND COMMAND DECODE IN A WORD PROCESSOR, WITH FULL COMMAND, MESSAGE AND HELP SUPPORT

BACKGROUND OF THE INVENTION

1. Technical Field

The invention disclosed broadly relates to information processing and more particularly relates to improvements in multilingual word processing.

2. BACKGROUND ART

Prior art information processing systems which employ a workstation interface, typically provide only a single language, such as English, for outputting screen image descriptions such as messages and help support. To the extent that commands input by the user to the keyboard have a mnemonic quality, they are also in the same language. The inconvenience presented to a user who is not fluent in the human interface language used by the prior art information processing system, becomes even more acute in word processing or text processing applications where the working text being produced by the user is displayed in a different language from the messages, help support and commands. Typical prior art approaches to providing a different human interface language for an information processing system require a complete reprogramming of the display manager and the keyboard manager. The problem becomes critically acute in distributed word processing systems where users of separate ones of the terminals connected to the mutually shared host computer, require diverse human interface languages to communicate with the information processing system.

OBJECTS OF THE INVENTION

It is therefor an object of the invention to provide an improved multilingual capability for information processing systems.

It is another object of the invention to provide an improved multilingual capability for word processing systems.

It is still another object of the invention to provide an improved multilingual capability for distributed word processing systems.

It is yet a further object of the invention to provide an improved multilingual capability for screen image build and command decode in distributed word processing systems.

It is still another object of the invention to provide an improved multilingual capability for distributed word processing systems, with full command, message and help support.

SUMMARY OF THE INVENTION

These and other objects, features and advantages of the invention are achieved by the multilingual processor disclosed herein, for building screen images on the display screen and for decoding multilingual commands, in an information processing system. The information processing system includes an execution unit having a memory, a bulk storage and a workstation connected thereto, the workstation including a keyboard connected to a display screen for inputting command and working text information to the display screen for display thereof.

In accordance with the invention, the multilingual processor includes a document library stored in the bulk storage device including a plurality of language documents and at least one user document. The language documents each characterize a selected language and include an initialization records portion, a displayable components portion and an executable components portion.

The multilingual processor further includes a language document selector means, for accessing a selected one of the plurality of language documents in response to a user language selection input from the keyboard specifying that commands are to be input to the keyboard and messages are to be displayed on the display screen in one of the selected languages.

The multilingual processor further includes an initialization processor means, for accessing the initialization records portion from a first one of the language documents for storage in the memory, to provide a set of constant words to be displayed on the display screen in a first language.

The multilingual processor further includes a message processor means, for accessing the displayable components portion from the first one of the language documents, for the real-time display of messages on the display screen in the first language.

The multilingual processor further includes a command processor means for accessing the executable components portion from the first one of the language documents in response to a user command input in the first selected language to the keyboard, for decoding and executing the user command input in the first language.

Further in accordance with the invention, the language document selector means can access a second selected one of the plurality of language documents in response to a second user language selection input from the keyboard specifying that commands are to be input to the keyboard and messages are to be displayed on the display screen in a second one of the selected languages. In this manner, multilingual processing is achieved for screen image build and command decode.

BRIEF DESCRIPTION OF THE DRAWINGS

These and other objects, features and advantages of the invention will be more fully appreciated with reference to the accompanying figures.

FIG. 5 is a table showing the language document-to-screen image build and decode relationship.

DESCRIPTION OF THE BEST MODE FOR CARRYING OUT THE INVENTION

Figure 1:
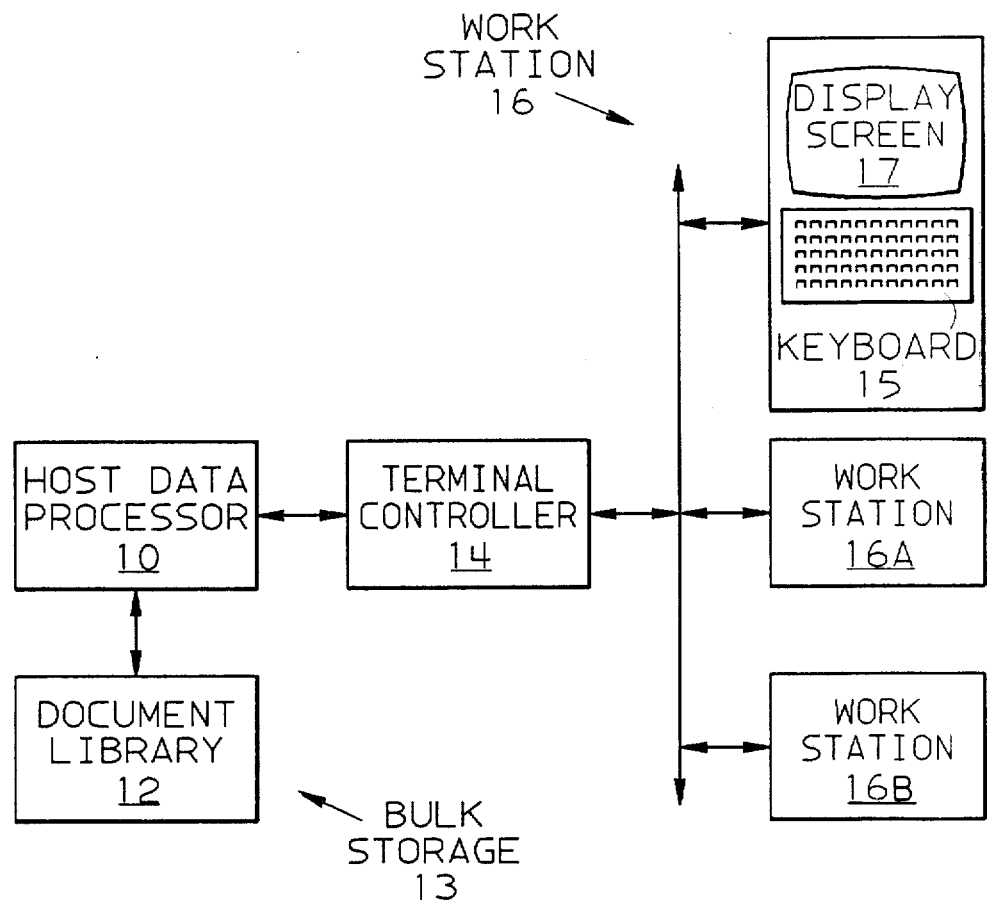
FIG. 1 is a diagram of the host data processing system.

The multilingual processor invention is described in FIGS. 1 through 8. FIG. 1 is a system diagram of the host data processing system within which the multilingual processing invention finds its preferred application. The host data processor 10 is connected through a terminal controller 14 to a plurality of workstations 16, 16A and 16B. The host data processor 10 is also connected to a bulk storage unit 13. The system configuration of FIG. 1 can be embodied with an IBM System/370-type Host Data Processor 10, such as an IBM 3081 Processor connected through an IBM 3274 terminal controller 14 to an IBM 3270 workstation 16. Details of such a configuration can be found, for example, in U.S. Pat. No. 4,271,479 to Cheselka, et al, entitled "Display Terminal With Modularly Attachable Features", which is assigned to the IBM Corporation. A more detailed description of the host data processor 10 can be found in *IBM System/370 Principles of Operations*, Order No. GA22-7000, published by the IBM Corporation, 1981. The host data processor 10 can employ an operating system such as the Virtual Machine/Conversational Monitor System (VM/CMS) which is described in *IBM Virtual Machine Facility/370 Introduction*, IBM Systems Library, Order No. GC20-1800, published by the IBM Corporation, 1981.

Figure 6:
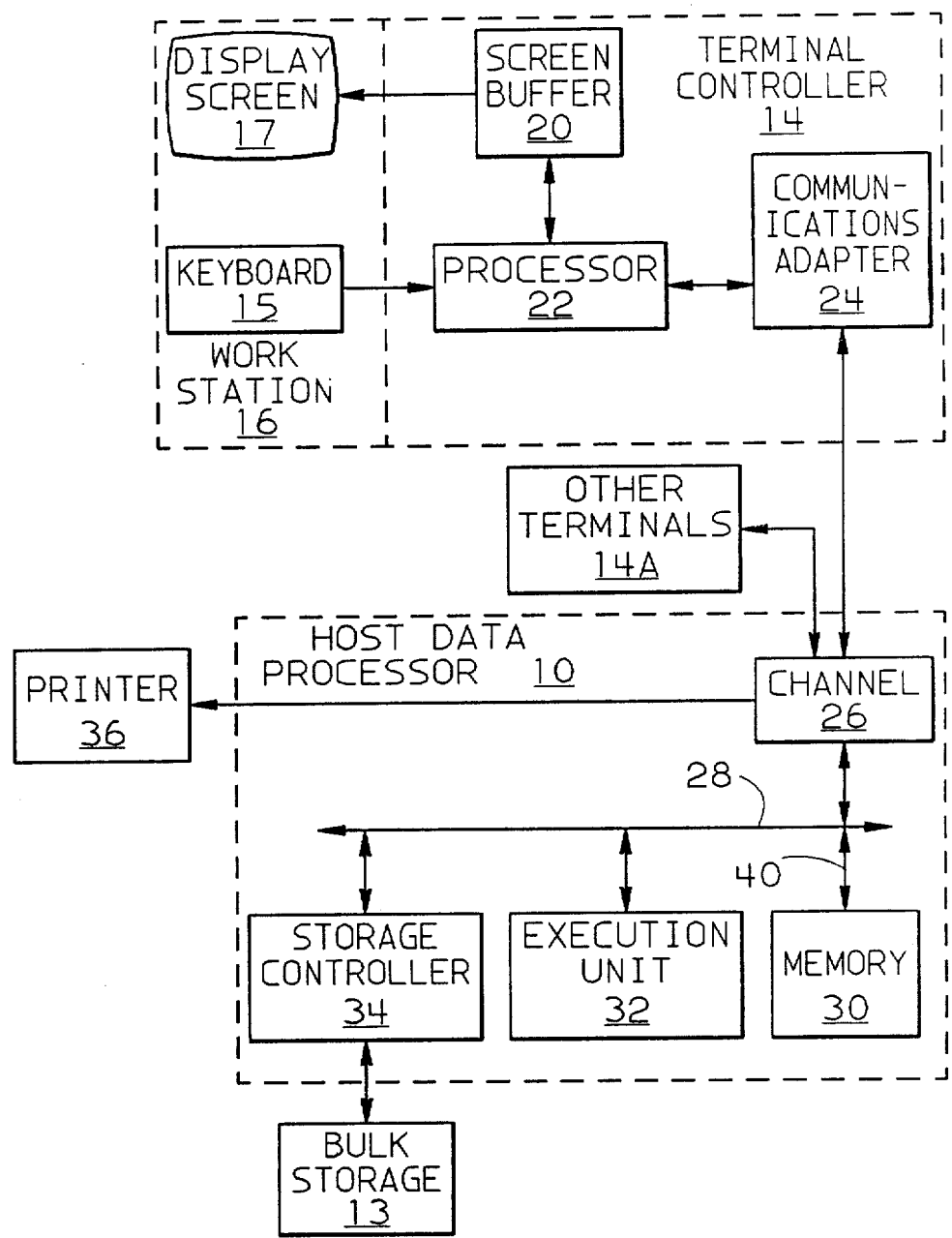
FIG. 6 is a more detailed system block diagram of the invention.

The system shown in FIG. 1 is described in greater detail in FIG. 6 where it is seen that the host data processor 10 has a primary bus 28 which interconnects the channel 26, the memory 30, the execution unit 32 and the storage controller 34. The bulk storage 13, which can be a large capacity disk drive such as an IBM 3380, is connected to the storage controller 34. The channel 26 is connected to a plurality of input/output terminals 14A. The channel 26 is also connected to the terminal controller 14. The terminal controller 14 includes a screen buffer 20 which is connected to the display screen 17, a processor 22 which is connected to the screen buffer 20 and also to the keyboard 15, and the communications adapter 24 which is connected to the processor 22. The communications adaptor 24 provides the communications interface with the channel 26 of the host data processor 10. The workstation 16, which includes the display screen 17 and the keyboard 15, is also shown in FIG. 6, as it is related to the terminal controller 14. In addition, the channel 26 includes an output to the printer 36.

A user at the workstation 16 will access the system by inputting commands and working text at the keyboard 15. This information is processed by the processor 22 which writes into the local screen buffer 20 for immediate display on the display screen 17. Whenever a command key or a function key is depressed on the keyboard 15, the processor 22 alerts the communications adapter 24 to transfer those portions of the working text which have been changed in the screen buffer 20, to the channel 26 of the host data processor 10. The information received by the channel 26 is transferred to the bus 28. Conversely, when information is provided by the bulk storage 13 through the information controller 34 to the bus 28, or by the execution unit 32 to the bus 28, or by the memory 30 to the bus 28, that information is transferred by the channel 26 to the communications adaptor 24 at the terminal controller 14 for display on the display screen 17.

Figure 7:
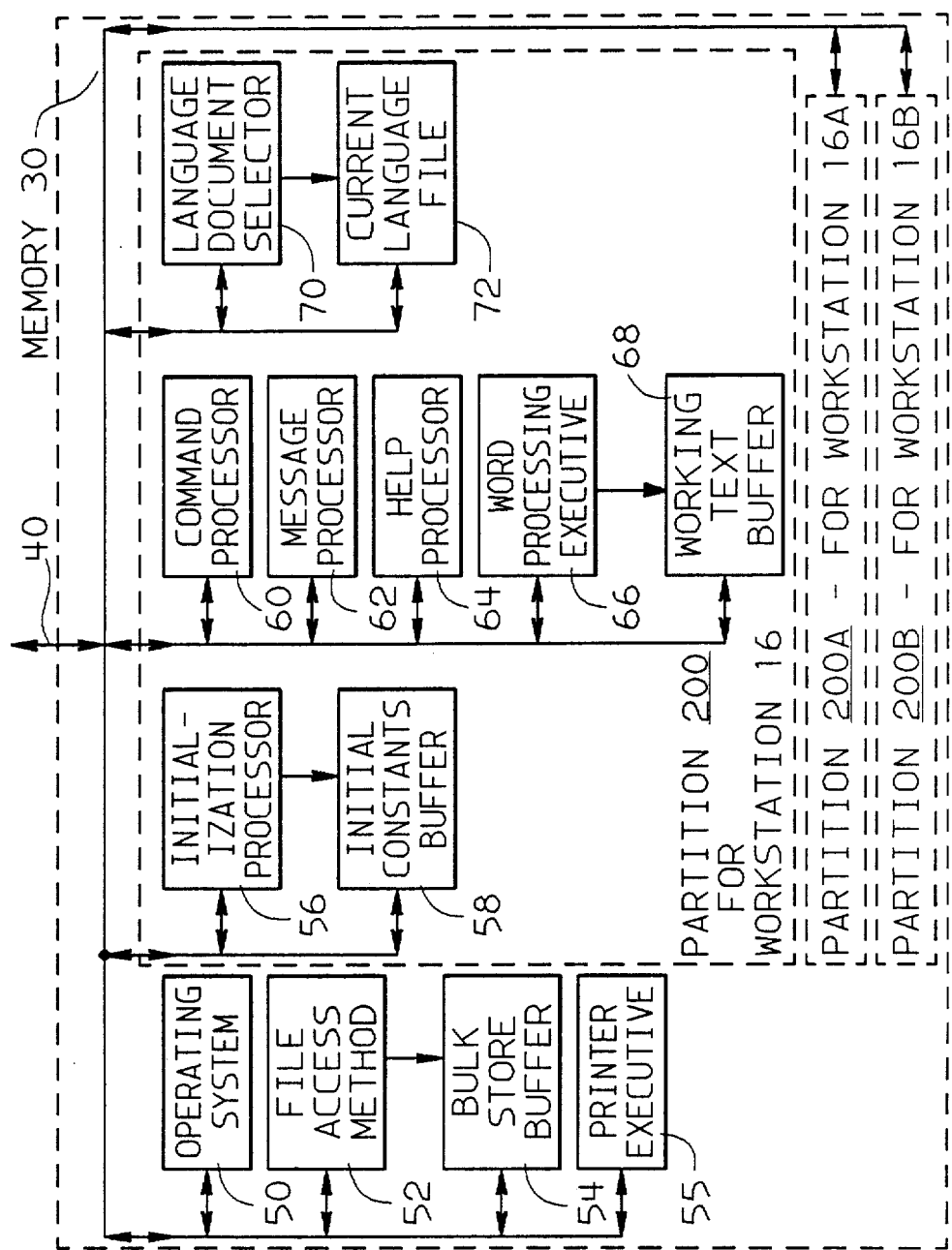
FIG. 7 is a logical block diagram showing the apparatus of the memory 30 including several designated data areas and functional programs controlling the operation of the system.

The random access memory 30 in the host data processor 10 includes a number of data areas and functional programs for operating with the data input into it through the bus 40 which is connected to the bus 28. FIG. 7 is a logical block diagram showing the apparatus of the memory 30 including several designated data areas and functional programs controlling the operation of the system. The instructions in each of the functional programs are executed by the execution unit 32. The memory 30 is divided into a plurality of substantially identical partitions 200, 200A and 200B which respectively perform the multilingual processor functions for workstations 16, 16A and 16B of FIG. 1. The VM/CMS operating system program 50 in the memory 30 provides the overall control for the operation of the host data processor 10 and provides the coordination of the memory partitions 200, 200A and 200B so that the users of the respective workstations 16, 16A and 16B appear to have seemingly separate and independent IBM System/370 computing systems. See the above cited VM/CMS reference for further details. The file access method 52 coordinates transfers of data between the bulk store buffer 54 in the memory 30 and the storage controller 34 which interfaces with the bulk storage 13. The printer executive 55 controls printer 36 operations through the channel 26.

Figure 2:
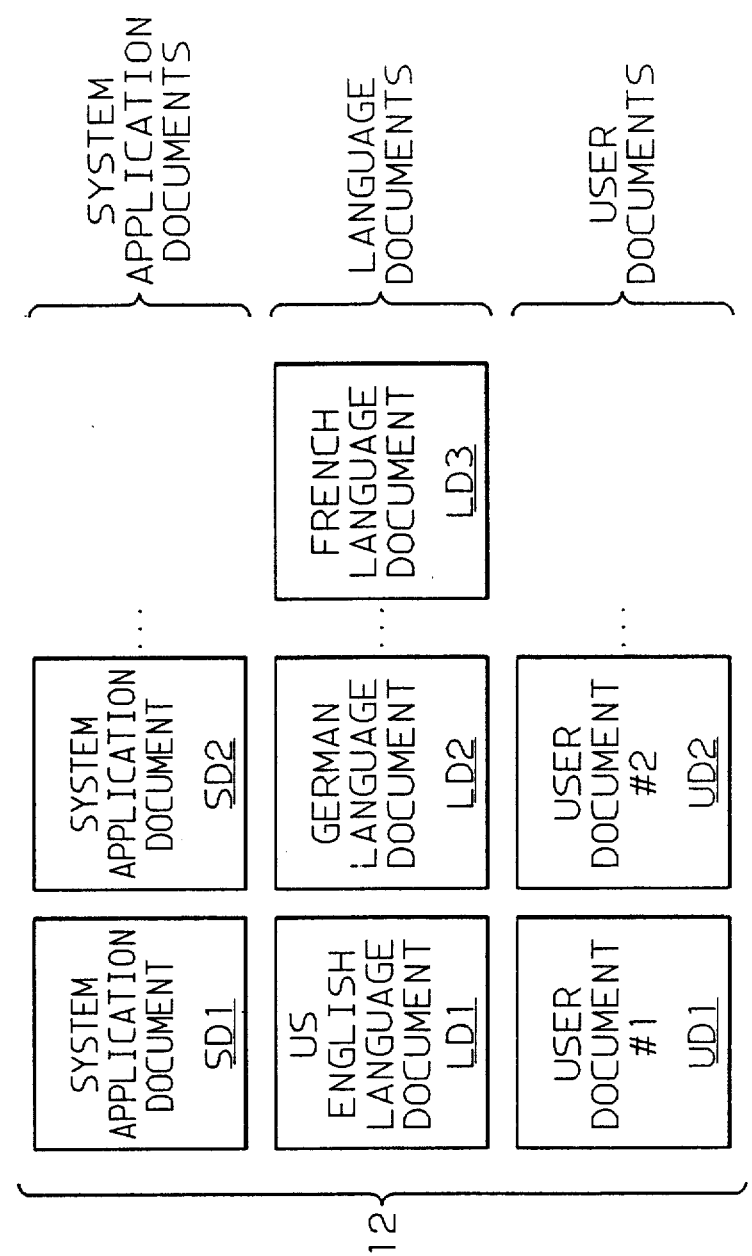
FIG. 2 is a conceptual block diagram of the document library 12 which resides in the bulk storage 13 shown in the system diagram of FIG. 1.

In accordance with the invention, the multilingual processor invention includes a document library 12 shown in FIG. 2, which is stored in the bulk storage device 13. The document library 12 includes a plurality of system application documents SD1, SD2, etc., which serve to provide application program information for the word processing function to be performed by the system. More particularly, in accordance with the invention, the document library 12 includes a plurality of language documents LD1, LD2, LD3, etc. The language documents each characterize a selected language, such as U.S. English, German, French, etc., which serve as the human interface language between the user and the commands input to the system and the messages displayed by the system at the workstation 16. Also included in the document library 12 is one or more user documents UD1, UD2, etc., which are the working text being prepared by the user during the word processing session. When a particular user document, UD1 for example, is to be edited during a word processing session, the file access method 52 of FIG. 7 loads the working text of UD1 from the document library 12 of FIG. 2, into the working text buffer 68 of FIG. 7. At the conclusion of editing UD1, the file access method 52 writes the user document UD1 back into the document library 12 of the bulk storage 13.

Figure 3:
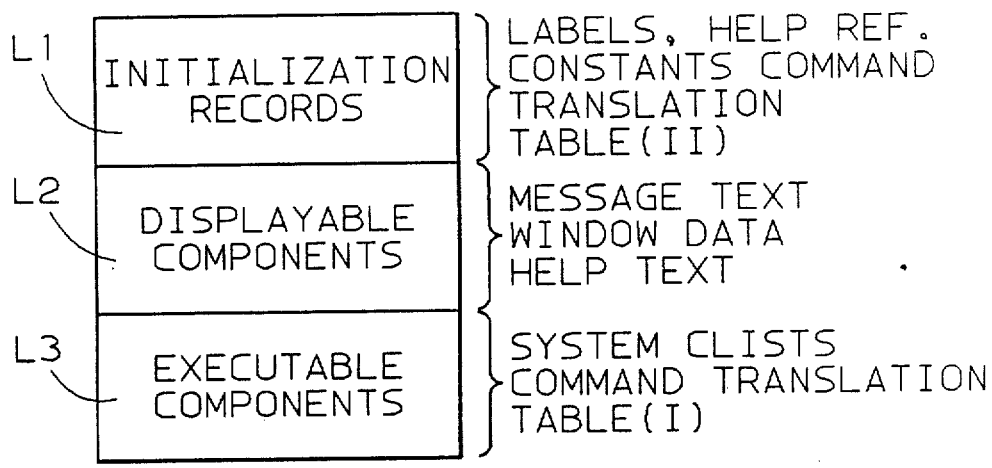
FIG. 3 is a schematic diagram of one of the language documents, characterizing a U.S. English language, German language or French language document, for example.

FIG. 3 shows an example of one of the language documents, for example the German language document LD2. Each language document characterizes a selected language such as the German language, which will be employed by the user as the human interface language for inputting commands to the keyboard 15 and for receiving messages and help from the display screen 17. The three portions of the language document of FIG. 3 are the initialization records portion L1, the displayable components portion L2, and the executable components portion L3.

In accordance with the invention, the multilingual processor further includes the language document selector 70 in the memory 30 of FIG. 7. The language document selector 70 accesses a selected one of the plurality of language documents LD1, LD2, LD3, etc., from the document library 12, in response to the user providing a language selection input from the keyboard 15 specifying that the human interface language for the commands, messages, etc. is to be a selected language, such as German. The language document selector 70 will receive the language selection input over the bus 40 and will cause the file access method 52 to access the bulk storage 13 through the storage controller 34, the bus 28, and the bulk storage buffer 54 to obtain the data from the language document corresponding to the selected language. The identity of the current selected language is stored by the selector 70 in the current language file 72 in memory 30.

Further in accordance with the invention, the multilingual processor includes an initialization processor 56 shown in the memory 30 of FIG. 7. The initialization processor 56 operates when a new human interface language has been newly selected by the language document selector 70. The initialization processor 56 accesses the initialization records portion L1 from the newly selected language document in the document library 12, to provide a set of constant words which are loaded into the initial constant portion 58 of the memory 30. The set of constant words in the initial constant portion 58 will be continually displayed on the display screen 17 during the interval when the newly selected language serves as the current human interface language.

Further in accordance with the invention, the multilingual processor includes the message processor 62 shown in the memory 30 of FIG. 7. The message processor 62 accesses the displayable components portion L2 from the current language document LD2 in the document library 12, for the real-time display of messages on the display screen 17 in the current human interface language specified by the current language file 72. In a similar manner, the help processor 64 shown in the memory 30 of FIG. 7, accesses the displayable components portion L2 of the current language document in the document library 12, for the real-time display of help on the display screen 17 in the current human interface language specified by the current language file 72.

Still further in accordance with the invention, the multilingual processor further includes the command processor 60 shown in the memory 30 of FIG. 7. The command processor 60 accesses the executable components portion L3 of the current language document in the document library 12, in response to the user making a command input at the keyboard 15 in the current human interface language specified by the current language file 72. The command processor 60 operates to decode the command input by the user in the current human interface language. The command processor 60 further operates to provide proper control signals to the execution unit 32 to execute the command input by the user. Still further, the command processor 60 operates to provide a real-time display to the user of any response to the command input on the display screen in the current human interface language.

If the user desires to change the current human interface language, the language document selector 70 will access a second selected one of the language documents in the document library 12, in response to a second language selection input by the user to the keyboard 15, specifying that the command and messages, etc., are to be in a second human interface language characterized by another one of the language documents LD1, LD2, LD3, etc. In this manner, multilingual processing is achieved for screen image building and decoding, in an improved manner.

OPERATION OF THE MULTILINGUAL PROCESSOR INVENTION

Figure 8:
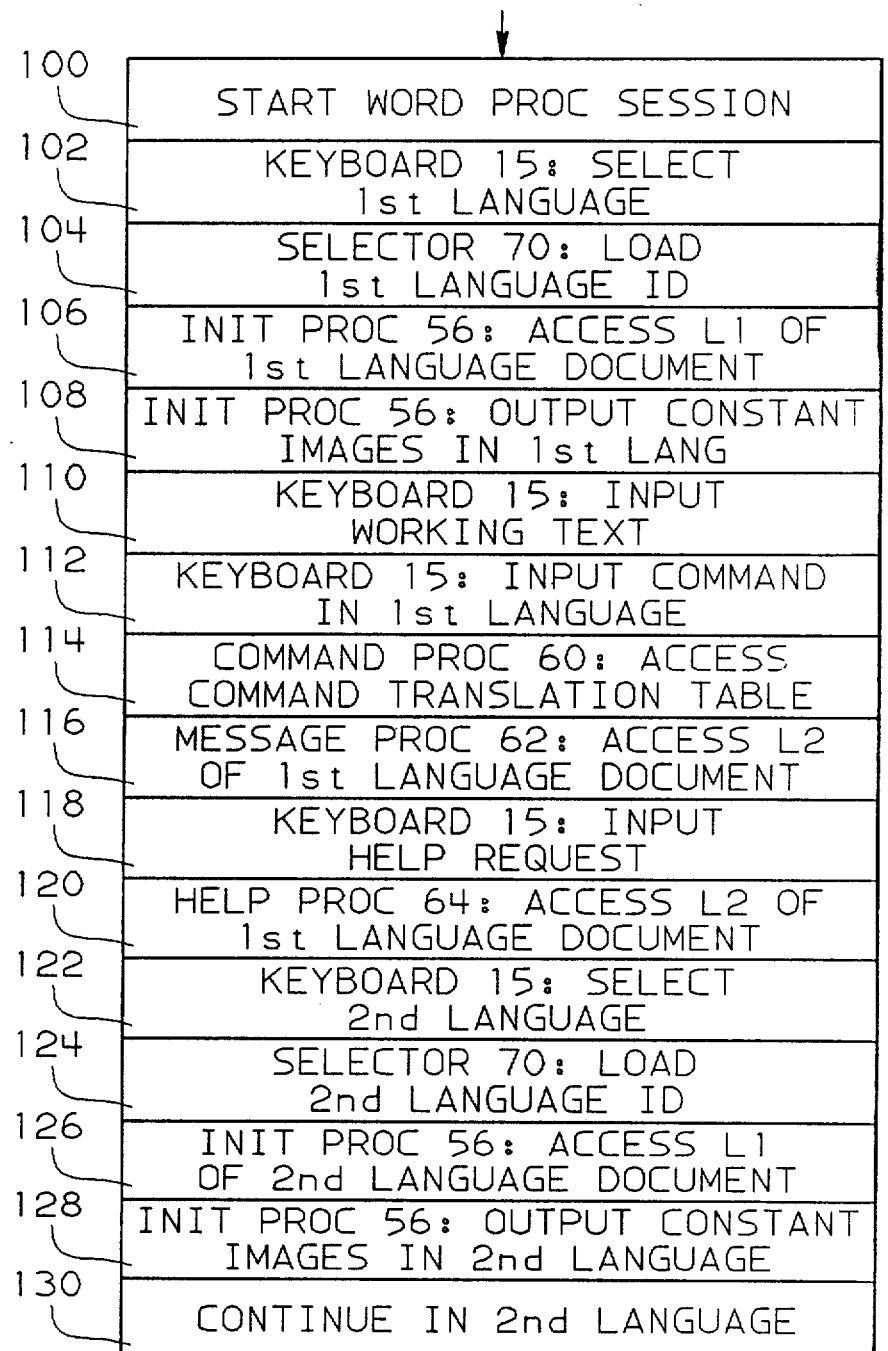
FIG. 8 is a flow diagram showing the sequence of operational steps in a word processing session using two consecutive human interface languages, in accordance with the invention.

The operation of the multilingual processor invention can be better appreciated with reference to the flow diagram of FIG. 8. The figure shows the sequence of operational steps in a typical word processing session using two consecutive human interface languages. In the example given, the first language is German and the second language is French.

In FIG. 8, the first step 100 starts the word processing session by initializing the operating system 50 and the word processing executive 66 shown in the memory 30 of FIG. 7.

In step 102 of FIG. 8, the user inputs a Set Language command to the keyboard 15, selecting the first human interface language to be German.

In step 104 of FIG. 8, the language document selector 70 of FIG. 7, responds to the Set Language command and loads the identity of the first selected language (German) into the current language file 72 of FIG. 7. The selector 70 then passes control to the initialization processor 56 of FIG. 7.

In step 106 of FIG. 8, the initialization processor 56 calls the file access method 52 of FIG. 7, to access the initialization records portion L1 of the first language document LD2 of FIG. 2 (which characterizes the German language) and to load the L1 portion into the initial constants buffer 58 of FIG. 7. In step 108 of FIG. 8, the initialization processor 56 then outputs constant words in the German language, from the initial constants buffer 58, which will be continuously displayed on the display screen 17 during substantially the entire interval that German is the selected human interface language. An example of this would be the display of the German word "Seite" for "page", which will precede the display of the current page number on the screen 17.

The same number of word constants are required to be displayed on screen 17, regardless of the current selected language. For example, the five word constants "page", "line", "document", "header", and "footer" are required for U.S. English, and are located in the L1 portion of the U.S. English language document LD1. Similarly, the L1 portion of the German language document LD2 contains the German language version for each of these five word constants "Seite", "Zeile", "Dokument", "Briefkopf", and "Briefende", respectively. In response to the initialization processor 56, the file access method 52 accesses the L1 portion of the current language document and returns five word constants (in this example) for loading into the initial constants buffer 58. If the current language document is LD1, then the five constants are the U.S. English word constants "page", "line", "document", "header", and "footer". If the current language document is LD2, then the five constants are the German word constants "Seite", "Zeile", "Dokument", "Briefkopf", and "Briefende".

In step 110 of FIG. 8, the user inputs working text to the keyboard 15, which is accumulated in the screen buffer 20 of FIG. 6. Whenever the user hits the Enter key on keyboard 15, portions of the working text are transferred to the working text buffer 68 of FIG. 7. Word processing operations are performed on the working text in the buffer 68 by the word processing executive 66 of FIG. 7, in response to word processing commands input by the user to the keyboard 15. The language of the working text being created by the user is immaterial to the multilingual processor invention and can be the same as the currently selected German human interface language or it can be another language. The problem solved by the multilingual processor invention herein is how a user who is fluent in his own language, can control a word processor which was programmed to respond to commands in a language foreign to the user.

In step 112 of FIG. 8, the user inputs a command to the keyboard, in the German language. For example, the user wishes to enter the command to right justify the working text which has accumulated in the buffer 68, and therefor the user types in the German word "Rechts" to the keyboard 15.

In step 114 of FIG. 8, the command processor 60 receives the new command. The default language for the command processor 60 is U.S. English, that is, commands which are input to the command processor 60 in U.S. English can be immediately decoded and executed. When the command processor 60 receives a new command, it refers to the identity of the current selected language which is stored in the current language file 72. If the current language is indicated as U.S. English, the command processor 60 will immediately attempt to decode the command. However, as in the present example, if the current language indicated by the current language file 72 is not U.S. English, but is German, then the command processor 60 needs to have the new command translated into U.S. English before proceeding with the decoding operations. In this case, the command processor 60 calls the file access method 52 of FIG. 7, to access the executable components portion L3 of the first language document LD2 of FIG. 2 (which characterizes the German language) and to fetch the U.S. English translation of the German language command "Rechts" from the L3 portion and return it to the command processor 60 as the command to be decoded and executed. The U.S. English translation of "Rechts" is the word "right" and it is this command word which is then decoded by the command processor 60 for execution of the right justify command desired by the user.

The executable components portion L3 of the language document LD2 includes a command translation table of valid German language commands and their corresponding U.S. English translations which are understandable by the command processor 60. For example, in addition to the command pair "Rechts"/"right", the command translation table in the L3 portion of the language document LD2 can include command pairs such as "Einfgen"/"insert", "Finden"/"find", "Hilfen"/"help", "Links"/"left", etc. In response to the command processor 60, the file access method 52 will search the L3 portion of the language document LD2 for the command pair containing the German language command called for and when the target command pair is found, the file access method 52 will return the corresponding U.S. English translated command word to the command processor 60.

The final stage in the execution of the command in step 114 may require the issuing of a message to the display screen 17, such as the message "Operation completed". Continuing with the present example, when the word processing executive 66 completes the operation of right justifying the working text in the working text buffer 68, it passes control and a message access code to the message processor 62 of FIG. 7 to carry out the process of issuing the desired message. In step 116 of FIG. 8, the message processor 62 then refers to the identity of the current selected language which is stored in the current language file 72 (German, in this example). The message processor 62 then calls the file access method 52, to access the displayable components portion L2 of the first language document LD2 of FIG. 2 (which characterizes the German language) and to fetch the German language message "Verfahren vollendet" associated with the message access code supplied by the message processor 62. The desired German language message is returned to the message processor 62 for transmission to the display screen 17.

The displayable components portion L2 of each language document LD1, LD2, LD3, etc. contains substantially the same set of messages, each set being expressed in the human interface language which characterizes the respective document, for example U.S. English, German, French, etc., respectively. Each message in the L2 portion of a given language document is associated with a corresponding message access code which is unique within that language document but which is identical to the message access code for the corresponding message in the other language documents. For example, the displayable components portion L2 of the U.S. English language document LD1 can have the following three U.S. English messages respectively associated with their corresponding message access codes: DK001="The language is now U.S. English", DK002="You have reached the document", DK003="Operation completed". The same three message access codes will also be found in the German language document LD2. The displayable components portion L2 of the German language document LD2 will have the following three German language messages respectively associated with their corresponding message access codes: DK001="Die Sprache ist jetzt deutsch", DK002="Sie haben das Dokument erreicht", DK003="Verfahren vollindet".

In step 118 of FIG. 8, the user inputs a help request to the keyboard 15. The display of help text in response to the user's requests for such help, operates in substantially the same manner as the display of messages described above for step 116. In step 120 of FIG. 8, in response to the user's input at the keyboard 15, the help processor 64 refers to the identity of the current selected language which is stored in the current language file 72 (German, in this example). The help processor 64 then calls the file access method 52, to access the displayable components portion L2 of the first language document LD2 of FIG. 2 (which characterizes the German language) and to fetch the German language help text associated with the help access code supplied by the help processor 64. The desired German language help text is returned to the help processor 64 for transmission to the display screen 17.

The displayable components portion L2 of each language document LD1, LD2, LD3, etc. contains substantially the same set of help texts, each set being expressed in the human interface language which characterizes the respective document, for example U.S. English, German, French, etc., respectively. Each help text in the L2 portion of a given language document is associated with a corresponding help access code which is unique within that language document but which is identical to the help access code for the corresponding help text in the other language documents.

In this example, the user desires to change the current human interface language from German to French. In step 122 of FIG. 8, the user inputs a Set Language command to the keyboard 15, selecting the second human interface language to be French.

In step 124 of FIG. 8, the language document selector 70 of FIG. 7, responds to the Set Language command and loads the identity of the second selected language (French) into the current language file 72 of FIG. 7. The selector 70 then passes control to the initialization processor 56 of FIG. 7.

In step 126 of FIG. 8, the initialization processor 56 calls the file access method 52 of FIG. 7, to access the initialization records portion L1 of the second language document LD3 of FIG. 2 (which characterizes the French language) and to load the L1 portion into the initial constants buffer 58 of FIG. 7. In step 128 of FIG. 8, the initialization processor 56 then outputs constant words in the French language, from the initial constants buffer 58, which will be continuously displayed on the display screen 17 during substantially the entire interval that French is the selected human interface language.

Subsequent operations to input commands and to display messages and help text in the French language continue in the same manner as the operations described above for the German language, as is indicated in step 130 of FIG. 8.

In an alternate embodiment of the invention, the command translation table of valid German language commands and their corresponding U.S. English translations which are understandable by the command processor 60, can be made a part of the initialization records portion L1 of the language document. Then when step 106 of FIG. 8 occurs, the initialization processor 56 calls the file access method 52 of FIG. 7, to access the initialization records portion L1 of the first language document LD2 of FIG. 2 (which characterizes the German language) and to load the L1 portion into the initial constants buffer 58 of FIG. 7, including the command translation table.

Then, in this alternate embodiment, when the user inputs a command to the keyboard, in the German language (for this example), step 114 of FIG. 8, will proceed as follows. When the command processor 60 receives a new command, it refers to the identity of the current selected language which is stored in the current language file 72. If the current language is indicated as U.S. English, the command processor 60 will immediately attempt to decode the command. However, as in the present example, if the current language indicated by the current language file 72 is not U.S. English, but is German, then the command processor 60 needs to have the new command translated into U.S. English before proceeding with the decoding operations. In this case, the command processor 60 accesses the initial constants buffer 58, of FIG. 7, to access the command translation table and to fetch the U.S. English translation of the German language command and return it to the command processor 60 as the command to be decoded and executed.

In either the first described embodiment or the alternate embodiment of the invention, the executable components portion L3 of the language documents LD1, LD2, etc. may include strings of command elements called a command list or CLIST, which can be accessed from the document library 12 by the command processor 60 in the same manner as the accessing of the commands in the executable components portion L3 of the language documents in the document library, as previously described.

The following provides a further detailed description of the relationship between the language documents and the screen image.

The language document contains the following functional pieces:
1. Initialization Data
2. Message Text
3. Control Acronyms
4. Help Panels
   a. Quick Help
   b. More Help
   c. Menu Help
   d. Message Help
   e. Reference Help
   f. Controls Help
5. CLIST definitions
6. Command Panels Each functional piece of the document is started by a LABEL control. It continues until the next LABEL, or until the end of the document. The label consists of 4 items:
1. The name of the piece
2. The type of the piece
3. The default help
4. Additional processing information The linkage between pieces is done by two mechanisms:
1. The default help field in the label gives a linkage to the help for CLISTs and panels, and the more detailed help for help panels.
2. Any panel (either help or command) may contain a HELP REFERENCE control. If help is requested when the cursor is in a field controlled by a help reference, then the linkage is to the piece named by the help reference.

If an alternate language is desired, then the entire document is replaced. The information from the initialization section must also be read into storage.

The above functional pieces of language document are organized into three general sections, initialization records L1, displayable components L2 and executable components L3.

The initialization records L1 include editor constants which are translatable based on the specific language; acronyms for specific controls which can exist within the document itself; and items needed for initialization such as the initial PF keys, settings, command and operand synonyms, translate tables, escape sequences, etc.

The displayable component L2 of the language document contains items that may be briefly needed during the current session such as message text, window data for building windows, (for command panels) and the different types of help messages.

The third part of the language document of FIG. 3 is the executable component L3, which includes the system CLISTs, command lists which are needed during the edit session. A CLIST is a sequence of elementary commands defined by the user and callable by a single command word.

Within each of the components of a language document, for example the displayable component L2, a label located at the beginning of an entry designates whether it is for a command panel or a help panel. This is identified by a control label. The control label specifies the name of the portion accessed, the type, for example a CLIST, a help window, a message help, etc., the default help associated with this portion, and any other additional processing information that is needed. Additionally, within each of the window panels, there is a help reference controller which specifies an associated field. When windows are displayed, this enables the system to move through a series of windows from one to the other, because the help reference controller will point to the next label.

Figure 4:
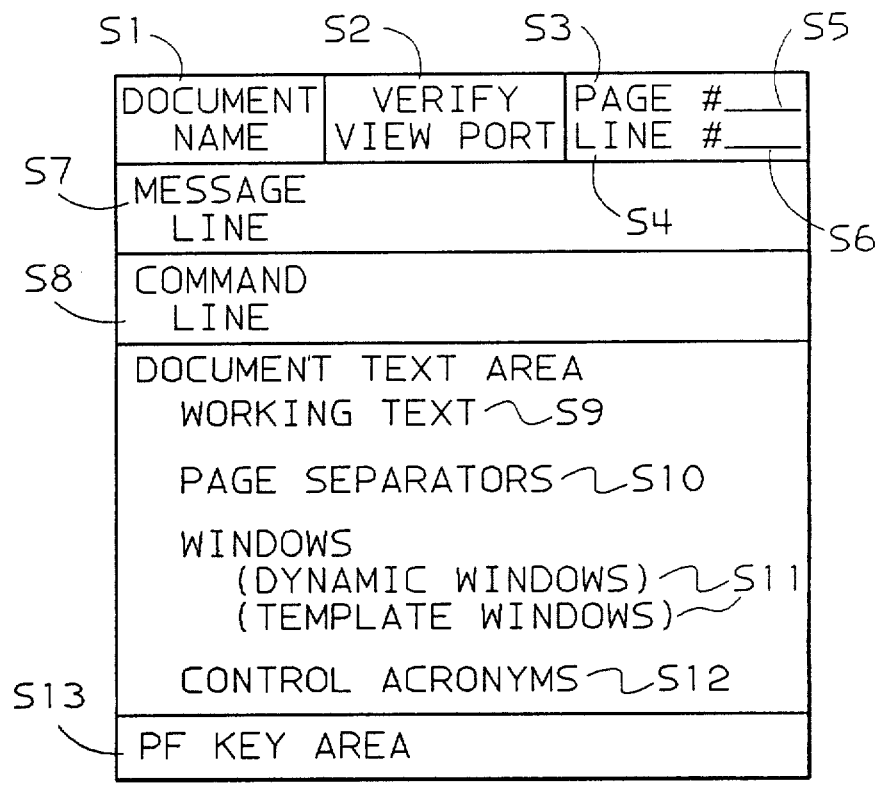
FIG. 4 is a layout diagram of the screen image at one of the workstations 16 in the system diagram of FIG. 1.

Each screen which is built has various parts associated with it. Referring to FIG. 4, the upper left-hand corner shows the document name S1 that is currently being edited. S2 refers to the verify-view-port. This is a small area of the screen that specifies a special operation currently occurring, for example, a spelling task, a move, a copy, etc. S3–S6 refer to the page and line number which is the first part of the document displayed on the screen. S7 is a message line where any messages that the editor has will be displayed. S8 is the stationary command line, an area of the screen where a user can enter commands to be performed. S9-12 is the document text area of the screen. S9 is the actual working text of the document. S10–12 are optional. S10 is a page separator. The system can show multiple pages at once and the page separator has the name of the new page. S11 refers to any type of window which might be displayed. The window can be a command panel, a help panel, etc. If so designated, S12 can display the hidden controls of the document. If they are displayed in the document control area the user will see the two to three character acronym which is received from the current language document. S13 is the program function key area. This area is 0-4 lines of the screen displaying either 9, 12 or 24 PF key settings. It also shows displayable text that describes the function which is currently assigned to that key.

FIG. 5 is a table which describes the relationship between a language document and the building or decoding of a screen image. The left hand column of FIG. 5 identifies the screen area (shown in FIG. 4). The middle column of FIG. 5 describes which part of the language document has information in it which is needed to build the corresponding part of the screen. The right hand column of FIG. 5 shows which part of the language document of FIG. 3 has data in it which can or may be used to decode or read the information displayed on the screen in FIG. 4. S1, the document name, is not applicable in both cases. S2, which is the verify-view-port is a field that can come from any part of the language document. This is not used in decoding the screen. S3, the actual constant "page", comes from L1, initialization, and is a constant having the word "page" in the correct language. It is not used for decode. S4, the "line" constant is the same as "page", that is a translated constant that is kept in the initialization record and is not used for decode. S5 and S6 are the actual page and line number and these are resolved directly from the document and therefore are not involved in the language document. S7 is a message line. Any time a message is sent from the editor, a message i.d. is used and that is found directly in the displayable components L2 of the language document. It also can be from a CLIST, in which case the specific message text is given from L3 out of the language document. The message line is not used in decoding the screen. S8 is the command line which is not used in building but can be read in the case of a user command and can come from anywhere in the document; L1, L2 or L3. S9 is the working text which is transparent to the language document; the set is placed directly in the document. S10 is the page separator. In this case the system uses the constant per page, which is found in the initialization record L1 of the language document for building the screen (not applicable when decoding the screen). S11 are window panels which come from either L2, the displayable component of the language document, or in some cases some windows merely use some of the constants defined in L1 of the language document (none of which is applicable to reading the window). S12 are control acronyms which are constants defined in the initialization record L1 of the language document these are not used in decoding the screen). S13 is the "PF" key area and constants are used for the actual PF coming from L1 of the language document. In decoding a PF key hit, the system uses either L1, L2 or L3, depending on whether it is a constant, an acronym, a synonym or the name of an actual command or CLIST.

Referring to FIG. 2, to change the current language document during an edit session, use the command called Set Language. The user specifies the name of the new language in building and decoding screens, in other words, communicating with the editor itself. The editor then searches the document library 12 for the specified language document. When found, all the initialization records L1 of that document are then stored in memory 30 which gives access to the new constants and new command synonyms, new operand synonyms, and provides a new copy of the initial PF key settings. All of the old synonyms are now discarded and the user is ready to continue. The editor will now respond in this new language.

The resulting multilingual processing capability enables an improved technique for screen image building and screen image decoding in a word processor and which provides for full command, message and help support, in an improved manner.

Although a specific embodiment of the invention has been disclosed it is understood by those of skill in the art that changes can be made in the form and detail of the invention without departing from the spirit and the scope of the invention.

What is claimed is:

1. In an information processing system including an execution unit having a memory, a bulk storage and a workstation connected thereto operated by a user, said workstation including a keyboard connected to a display screen for inputting command and working text information to said display screen for display thereon, a multilingual processor for building screen images on said display screen and for decoding multilingual, user defined commands, comprising:

a document library stored in said bulk storage device including a plurality of language documents and at least one user document;

said language documents each characterizing a selected language and including an initialization records portion, a displayable components portion and an executable components portion including an sequence of elementary commands defined by the user;

a language document selector means, for accessing a selected one of said plurality of language documents in response to a user language selection input from said keyboard specifying that commands are to be input to said keyboard and messages are to be displayed on said display screen in a first one of said selected languages;

an initialization processor means, for accessing said initialization records portion from a first one of said language documents for storage in said memory, to provide a set of constant words to be continuously displayed on said display screen in said first language;

a message processor means, for accessing said displayable components portion from said first one of said language documents, for the real-time display of messages on said display screen in said first language;

a command processor means for accessing said sequence of elementary commands defined by the user in said executable components portion of said first one of said language documents in response to a user command input in said first selected language to said keyboard, for decoding said user command input in said first language;

said language document selector means accessing a second selected one of said plurality of language documents in response to a second user language selection input from said keyboard specifying that commands are to be input to said keyboard and messages are to be displayed on said display screen in a second one of said selected languages;

whereby multilingual processing is achieved for screen image build and decoding of user defined commands.

2. In an information processing system including an execution unit having a memory, a bulk storage and a workstation connected thereto operated by a user, said workstation including a keyboard connected to a display screen for inputting command and working text information to said display screen for display and decoding user defined commands, a multilingual processing method for building screen images on said display thereon, comprising the steps of:

storing a document library in said bulk storage device including a plurality of language documents and at least one user document;

said language documents each characterizing a selected language and including an initialization records portion, a displayable components portion and an executable components portion including a sequence of elementary commands defined by the user;

accessing a selected one of said plurality of languge documents with a language document selector means, in response to a user language selection input from said keyboard specifying that commands are to be input to said keyboard and messages are to be displayed on said display screen in a first one of said selected languages;

accessing said initialization records portion from a first one of said language documents for storage in said memory with an initialization processor means, to provide a set of constant words to be continuously displayed on said display screen in said first language;

accessing said displayable components portion from said first one of said language documents with a message processor means, for the real-time display of messages on said display screen in said first language;

accessing said sequence of elementary commands defined by the user in said executable components portion of said first one of said language documents with a command processor means, in response to a user command input in said first selected language to said keyboard, for decoding and executing said user command input in said first language;

accessing a second selected one of said plurality of language documents with said language document selector means, in response to a second user language selection input from said keyboard specifying that commands are to be input to said keyboard and messages are to be displayed on said display screen in a second one of said selected languages;

whereby multilingual processing is achieved for screen image build and decoding of user defined commands.

* * * * *